A. FALK.
SPOTLIGHT SUPPORT.
APPLICATION FILED MAR. 1, 1921.

1,393,678. Patented Oct. 11, 1921.

INVENTOR
Arthur Falk
BY Geo Stevens
ATTY.

UNITED STATES PATENT OFFICE.

ARTHUR FALK, OF DULUTH, MINNESOTA.

SPOTLIGHT-SUPPORT.

1,393,678.  Specification of Letters Patent.  Patented Oct. 11, 1921.

Application filed March 1, 1921. Serial No. 448,830.

*To all whom it may concern:*

Be it known that I, ARTHUR FALK, a citizen of the United States, residing at Duluth, in the county of St. Louis and State of Minnesota, have invented certain new and useful Improvements in Spotlight-Supports, of which the following is a specification, reference being had therein to the accompanying drawing.

This invention relates to spot lights and has special reference to a novel form of support and adjusting apparatus for spot lights associated with an automobile.

The principal object is to provide a device of this character which is simple and positive in operation and one that may be easily applied to any common type of car.

Other objects and advantages will appear in the further description of the invention.

Referring to the accompanying drawings forming part of this application and in which like reference characters indicate like parts:

Figure 1:
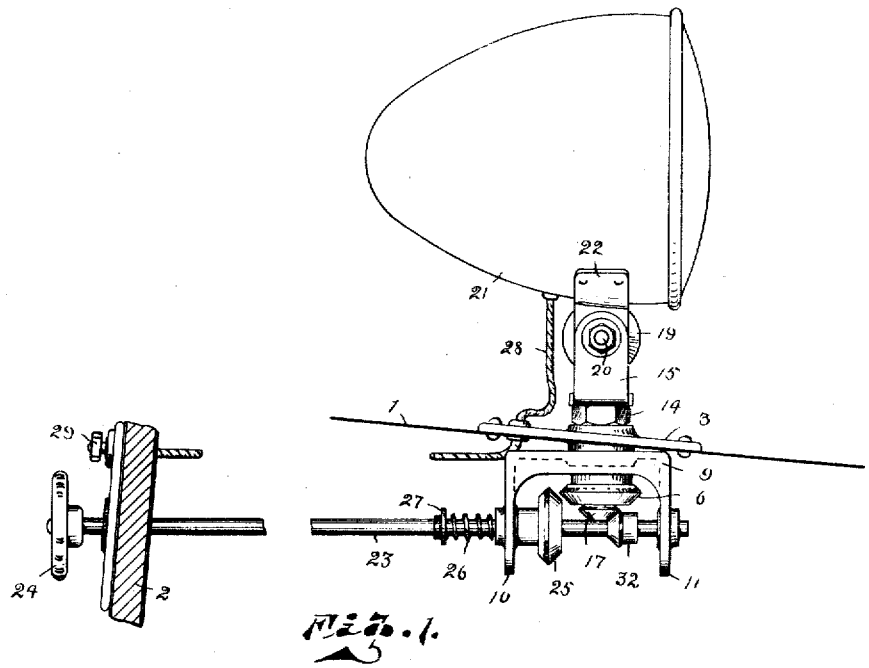
Figure 1 is a side elevation of a spot light mounted upon one of the improved supports and adjusting apparatus showing a fragmental portion of the apron and instrument board of a car.
Figure 2:
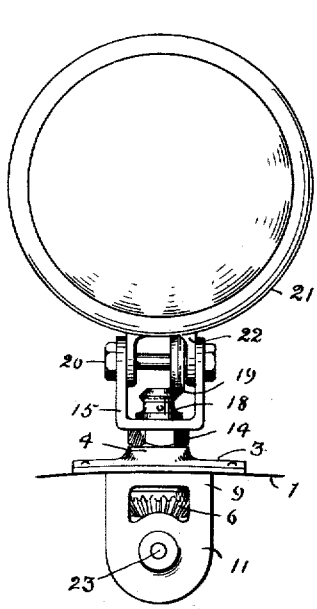
Fig. 2 is a front elevation of Fig. 1.
Figure 3:
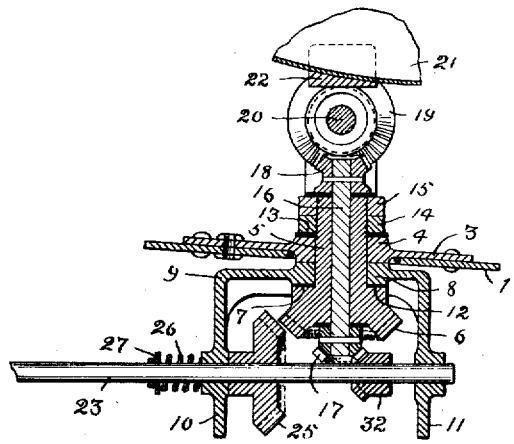
Fig. 3 is a central vertical section through the light supporting bracket longitudinally of the operating shaft.

1 represents the inclined apron of an automobile which forms the rear portion of the hood over the engine of a car and which occurs just forward of the wind shield and instrument board 2 thereof, it not being deemed necessary to illustrate other parts of the car in order to make the invention more comprehensive to those versed in the art.

3 represents the main support or bracket which is bolted or fastened in any desired manner upon the upper surface of the apron 1 of the car, a suitable opening or hole having been formed therein for such purpose and over which hole the bracket rests.

The central hub portion 4 of the support is somewhat thicker than the remainder thereof and is provided with a central bore through which the vertically disposed sleeve 5 extends, said sleeve having formed upon the lower end thereof and integral therewith the bevel gear 6, the hub portion of the bevel gear being considerably larger in diameter than that of the sleeve 5 forming an annular shoulder 7 intermediate of same.

Between this shoulder and the under face of the hub portion 4 of the support is held the hub portion 8 of the fork like depending bracket 9, the latter having two spaced forks or fingers 10 and 11, the object of which will be described later.

A fiber washer 12 is placed below the hub portion 8 of the bracket 9, and another one, indicated at 13, above the hub portion 4 of the support and against which a lock nut 14 impinges which is screw threadedly mounted upon the upper end of the sleeve 5 for retaining same in its proper position, the lock nut being tightened when in place against the under side of the upwardly extending fork like bracket 15 which is screw threadedly mounted upon the extreme upper end of the sleeve 5. By this arrangement it is evident that while the lock nut is placed upon the sleeve first, the bracket 15 being also screwed upon the end of the sleeve subsequently, the nut may be tightened up against the bracket when the desired positioning of the latter is accomplished to permit of the proper ease of rotation of the sleeve when being actuated.

Axially within the sleeve 5 is independently rotatably mounted the shaft or spindle 16 which has non-rotatably attached to the lower end thereof the beveled gear or pinion 17 and upon the upper end thereof a like gear 18, the latter meshing with the larger gear 19 mounted upon the transverse horizontally disposed shaft or bolt 20 which is mounted within the upper ends of the fingers of the bracket 15 and which also carries the spot light 21, the latter having a fork like depending bracket 22 on the bottom thereof through which the bolt 20 extends. The gear 19 is rigidly attached to the inside of one finger of the bracket 22 by suitable bolts or screws so that when the gear 19 rotates the light is tipped either up or down as is obvious, the bolt acting as the pivotal point of same, as well as a bearing for the gear 19.

Rotative motion is imparted to the spindle 16 by the gear 17 being brought into mesh with a like gear 32 rigidly fixed upon the horizontally disposed manually rotative operating shaft 23, the inner end of said shaft being mounted within the depending fingers 10 and 11 of the bracket 9 and the gear 32 being intermediate of said fingers. The shaft 23 extends inwardly toward the body of the automobile and passes through the instrument board 2, where, upon its inner end, it carries fixed thereto the hand wheel 24 and by which it is rotated in either direction. Intermediate of the fingers 10 and 11 of the bracket 9 and in opposed relation to the small beveled gear 32 is a larger beveled gear 25 it also being fixed upon the shaft 23 and spaced a sufficient distance from the gear 32 so that when the latter is in mesh with its sister gear the former is out of mesh with its coöperative gear, which is that designated by the numeral 6, and such position of the gears is clearly illustrated in the accompanying drawing. The shaft 23 is susceptible of longitudinal movement and when thrust forwardly the gears 17 and 32 will go out of mesh simultaneously with the gears 6 and 25 going into mesh and the tuning of the shaft in either direction will correspondingly rotate the sleeve 5, thus imparting horizontal rotary motion through the bracket 15 to the spot light so that by this arrangement any desired combination of rotation of the shaft with the endwise adjustment in either direction will suffice to face the spot light in any direction.

The shaft 23 is preferably normally retained in its retracted position by the expansive spiral spring 26 intermediate of the collar 27 on the shaft 23 and the finger 10 of the bracket 9. At 28 I have illustrated the electric wire connection to the lamp, the controlling button of which is shown at 29 on the instrument board.

Having thus described my invention, what I claim and desire to secure by Letters Patent, is:

A control for spot lights of the character described comprising a suitable support, two independently operative concentrically disposed rotatable members in the support, an upwardly extending bracket rigidly fixed to the outermost one of said rotative means, a spot light supported above the bracket, a depending bracket intermediate of the spot light and said first mentioned bracket pivotally attached to said latter bracket, the depending bracket being controlled by the innermost one of said rotative members and manually controlled means for operating the rotative means independently.

In testimony whereof I hereunto affix my signature in the presence of two witnesses.

ARTHUR FALK.

Witnesses:
S. C. Bronson,
S. Geo. Stevens.